(12) United States Patent
Burg

(10) Patent No.: US 7,864,939 B1
(45) Date of Patent: Jan. 4, 2011

(54) CALL ARRANGEMENT AND CONNECTION USING MESSAGING

(75) Inventor: Frederick Murray Burg, West Long Branch, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1202 days.

(21) Appl. No.: 10/828,397

(22) Filed: Apr. 20, 2004

Related U.S. Application Data

(60) Provisional application No. 60/466,597, filed on Apr. 30, 2003.

(51) Int. Cl.
*H04M 3/42* (2006.01)

(52) U.S. Cl. .................. 379/205.01; 379/88.17; 455/466

(58) Field of Classification Search ............ 379/209.01, 379/211.01, 207.15, 210.01, 88.17, 93.01, 379/93.35, 70, 88.23, 207.08, 202.01–205.01; 709/206, 207
See application file for complete search history.

(56) References Cited

U.S. PATENT DOCUMENTS

| | | | | |
|---|---|---|---|---|
| 5,805,587 | A * | 9/1998 | Norris et al. ................. 370/352 |
| 5,898,770 | A * | 4/1999 | Valentine .................... 379/249 |
| 6,011,782 | A * | 1/2000 | DeSimone et al. .......... 370/260 |
| 6,064,730 | A * | 5/2000 | Ginsberg ................ 379/265.09 |
| 6,259,772 | B1 * | 7/2001 | Stephens et al. ......... 379/88.23 |
| 6,411,605 | B1 * | 6/2002 | Vance et al. ................. 370/261 |
| 6,456,842 | B1 * | 9/2002 | Subramanian et al. ... 455/414.3 |
| 6,532,286 | B1 * | 3/2003 | Burg ..................... 379/209.01 |
| 6,564,261 | B1 * | 5/2003 | Gudjonsson et al. ........ 709/227 |
| 6,631,188 | B1 * | 10/2003 | Sands .................... 379/215.01 |
| 6,704,404 | B1 * | 3/2004 | Burnett .................. 379/209.01 |
| 6,724,878 | B2 * | 4/2004 | Burg ..................... 379/215.01 |
| 6,731,609 | B1 * | 5/2004 | Hirni et al. .................. 370/260 |
| 6,760,412 | B1 * | 7/2004 | Loucks .................... 379/88.13 |
| 6,775,370 | B2 * | 8/2004 | Burg ..................... 379/215.01 |
| 6,804,334 | B1 * | 10/2004 | Beasley et al. ............ 379/88.17 |
| 6,810,116 | B1 * | 10/2004 | Sorensen et al. ....... 379/202.01 |
| 6,816,493 | B2 * | 11/2004 | Shi et al. .................. 370/395.4 |
| 6,870,916 | B2 * | 3/2005 | Henrikson et al. ..... 379/202.01 |
| 6,879,683 | B1 * | 4/2005 | Fain et al. .............. 379/265.02 |
| 6,882,641 | B1 * | 4/2005 | Gallick et al. ............... 370/356 |
| 6,882,828 | B1 * | 4/2005 | Kregel ......................... 455/70 |
| 7,031,437 | B1 * | 4/2006 | Parsons et al. ........... 379/88.12 |
| 7,177,404 | B2 * | 2/2007 | Rosenthal ................ 379/88.17 |
| 7,245,612 | B2 * | 7/2007 | Petty et al. .................. 370/356 |
| 7,313,229 | B1 * | 12/2007 | Sherwood ................ 379/88.22 |
| 7,580,374 | B1 * | 8/2009 | Gilbert ...................... 370/260 |
| 2002/0169834 | A1 * | 11/2002 | Miloslavsky et al. ........ 709/206 |
| 2003/0009530 | A1 * | 1/2003 | Philonenko et al. ......... 709/206 |
| 2003/0035381 | A1 * | 2/2003 | Chen et al. .................. 370/261 |
| 2003/0095651 | A1 * | 5/2003 | Book et al. ............. 379/211.01 |
| 2003/0142807 | A1 * | 7/2003 | Dolan et al. ........... 379/211.02 |
| 2003/0199274 | A1 * | 10/2003 | Lim ......................... 455/445 |
| 2004/0054743 | A1 * | 3/2004 | McPartlan et al. .......... 709/206 |
| 2004/0076276 | A1 * | 4/2004 | Longman et al. ....... 379/106.02 |
| 2007/0155411 | A1 * | 7/2007 | Morrison .................... 455/466 |

* cited by examiner

*Primary Examiner*—Simon Sing
(74) *Attorney, Agent, or Firm*—Hoffmann & Baron, LLP

(57) ABSTRACT

A method and a system allows an Instant Message (IM) user or an E-mail user to arrange and to place a present or a future telephone call by way of a respective IM or E-mail, without dialing a telephone.

39 Claims, 5 Drawing Sheets

CALL ARRANGEMENT AND CONNECTION USING MESSAGING

CROSS REFERENCE TO RELATED APPLICATIONS

This application claims the benefit under 35 U.S.C. §119 (e) of U.S. Provisional Application No. 60/466,597 filed Apr. 30, 2003, which is incorporated herein by reference in its entirety.

STATEMENT REGARDING FEDERALLY SPONSORED RESEARCH

Not Applicable.

FIELD OF THE INVENTION

This invention relates generally to telephony and, more particularly, to a method and system for arranging and placing a telephone call.

BACKGROUND OF THE INVENTION

As is known in the art, the public switched telephone network (PSTN) connects two or more telephones in a telephone call. A telephone call generally includes two parts, a signaling portion and a real-time portion. The signaling portion is used to connect the telephone call, for example, to ring a telephone, and the real time portion is used to convey a communication, for example, a voice communication. The real-time portion is typically referred to as media. The media in a voice communication typically includes one or more of voice signals, fax signals, video signals, and voice-band modem data.

The signaling portion and the real time portion carried on the PSTN during a telephone call originate as analog signals from the conventional telephones, and can be converted to digital signals and back to analog signals within portions of the PSTN during transport of the signals from one conventional telephone to another.

There are a variety of signal formats associated with the PSTN. For example, the format of the signals can be Integrated Services Digital Network (ISDN) format in other parts of the PSTN. Parts of the signaling portion conventionally have different names depending upon the format, but each format has parts with similar functions. For example the signal used to ring a telephone in ISDN is a "setup" message. For another example, a signal generated when a telephone is answered is a "connect" message in the ISDN format.

It will be recognized that the PSTN is not the only type of network that can carry telephone calls. For example, Voice over Internet Protocol (VoIP) allows voice communications to be carried on a digital network capable of Internet Protocol (IP) communications, for example, the Internet. Signals within VoIP can have functions similar to those described above. For example, VoIP can include session initiation protocol (SIP) signals capable of ringing an Internet telephone or alerting an Internet-connected personal computer (PC), and also signals adapted to indicate that the Internet telephone or the PC has been answered by a person.

As is also known, in order to place a telephone call, whether through the PSTN or through a digital network capable of VoIP communications, a telephone caller can dial a telephone number, for example, by repeatedly rotating a telephone dial or by pushing buttons on a telephone keypad. Often, the telephone caller, before placing the telephone call, is not able to determine whether the person to whom the telephone call is placed is available to receive the telephone call.

When the telephone caller wants to arrange a telephone call with another person at a future time and date, the telephone caller can first call the person in order to arrange the specified time and date at which to place the telephone call. At the specified time and date, the telephone caller then must call the person, and the person must remember to be available to receive the telephone call. With this arrangement, two telephone calls are placed in order to achieve the telephone call at the specified future time and date, the first call to arrange the future time and date, and the second call at the future time and date.

With the above arrangement, the person to whom the telephone call is placed may not be available either when the telephone caller first attempts to arrange the future telephone call, or, once arranged, at the specified future time and date of the telephone call.

It would, therefore, be desirable to overcome the aforesaid and other disadvantages.

SUMMARY OF THE INVENTION

The present invention provides a method and a system for an Instant Message (IM) user or an E-mail user to arrange (e.g., to set up) and to place (e.g., to connect) a present or a future telephone call by way of a respective IM or E-mail, without dialing a telephone. Also provided is a system and method, which can automatically connect the present or future telephone call. While the present invention is often described below in terms of IMs and IM users, the concepts apply equally well to E-mail and E-mail users.

In accordance with the present invention, a method of connecting a telephone call includes receiving a message having caller information associated with a caller network device and called endpoint information associated with a called network device. In one particular embodiment, the message is an instant message, the message is received by a server, the caller network device is a caller telephone, and the called network device is a called telephone. The method also includes sending a first alerting signal to the called network device. In one particular embodiment, the first alerting signal results in a ringing at the called telephone. The method also includes detecting if a first connection signal is received from the called network device, for example, a first Session Initiation Protocol (SIP) "ok" signal associated with the called telephone. The method also includes sending a second alerting signal to the caller network device. In one particular embodiment, the second alerting signal results in a ringing at the caller telephone. The method also includes detecting if a second connection signal is received from the caller network device, for example a second SIP "ok" signal associated with the caller telephone, and connecting the called network device to the caller network device in response to the second connection signal.

With this particular arrangement, the method allows a telephone caller to arrange a future time and date of a telephone call with a person, without first placing a telephone call to set up the future time and date. The method also provides an automatic telephone connection at the future time and date between the caller network device and the called network device.

In accordance with another aspect of the present invention, a method of connecting a telephone call to a calling center includes receiving a message having caller information associated with a caller network device and calling center associated with the calling center. In one particular embodiment, the message is an instant message, the message is received by a server, and the caller network device is a caller telephone. The method also includes sending a first alerting signal to the calling center. In one particular embodiment, the first alerting signal results in a ringing at the calling center. The method also includes detecting if a first connection signal is received from the calling center, for example, a first SIP "ok" signal associated with the calling center. The method also includes sending a second alerting signal to the caller network device. In one particular embodiment, the second alerting signal results in a ringing at the caller telephone. The method also includes detecting if a second connection signal is received from the caller network device, for example a second SIP "ok" signal associated with the caller telephone, and connecting the called network device to the calling center in response to the second connection signal. In one particular embodiment, the method can also include sending calling center information to the calling center, for example, an IVR sequence, and receiving a calling center message having calling center knowledge. In one particular embodiment, the calling center knowledge includes a calling center queue time.

With this particular arrangement, the method allows a person to set up a telephone call to the calling center without having to wait on a telephone during a calling center queue time. The method also provides an automatic telephone connection from the telephone caller to the calling center when the calling center is able to process the telephone call.

In accordance with another aspect of the present invention, a system for connecting a telephone call includes a server adapted to receive a message having caller information associated with a caller network device and called endpoint information associated with a called network device. In one particular embodiment, the message is an instant message, the caller network device is a caller telephone, and the called network device is a called telephone. The system also includes a gateway coupled to the server and to a telephony network, adapted to provide communications from the server to the telephony network, wherein the server is adapted to send alerting signals to the called network device and to the caller network device, and the server is further adapted to detect connection signals from the caller network device and from the called network device.

With this particular arrangement, the system allows a telephone caller to set up a time and date of a future telephone call with a person, without first placing a telephone call to set up the future time and date. The system also provides an automatic telephone connection at the future time and date between the caller and the called telephone.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Before describing the call arrangement and connection of the present invention, some introductory concepts and terminology are explained. As used herein, a "calling center" refers to a group of people and computer hardware capable of receiving a plurality of telephone calls. A typical calling center receives telephone calls with an interactive voice response (IVR) system, which will be recognized to be a system that answers a telephone call and provides voice instructions leading a caller though one or more keypad pushes or voice responses on a telephone and sometimes data entry, eventually providing connection to a human agent. As is known, wait times associated with the connection to the human agent can vary greatly. Sometimes the wait time can be hours while the caller remains on hold.

Instant messages (IMs), carried either on the Internet, on an Intranet, or more generally on a network, are known to provide a convenient means of communication. By way of buddy lists which list screen names of particular IM users, an IM user can identify when a particular other IM user, identified on the buddy list, is on-line and capable of receiving an IM. By way of IM screens presented on graphical user interfaces associated with personal computers, two IM users can communicate using text messages. In some arrangements, video displays and voice can also be received by the IM users.

As used herein, a "telephone call network" refers to any network capable of transporting a signaling portion and a real time portion, including but not limited to, the public switched telephone network (PSTN) and the Internet, wherein the real time portion includes one or more of voice signals, fax signals, and voice-band modem data. As used herein, a "telephone call" refers to a communication associated with any telephone communication protocol, for example Session Initiation Protocol (SIP), and integrated services digital network (ISDN), having a signaling portion and a real-time portion, which is carried on a telephone call network.

For typical telephone communication protocols, for example Session Initiation Protocol (SIP) and Integrated Services Digital Network (ISDN), and for typical types of telephone call networks, as used herein, an "alerting" signal refers to a signal transported on a telephone call network, during a signaling portion, that results in an alert to a telephone call recipient indicating a request for a voice communication. For example, in the SIP format, as described above, the "invite" signal is an "alerting" signal and results in ringing of a telephone. A "connection" signal, as used herein, refers to a signal carried on a telephone call network, also during the signaling portion that indicates acceptance of the telephone call by the telephone call recipient. For example, in the SIP format, as described above, the "ok" signal is a "connection" signal and results in connection of a telephone call.

Figure 1:
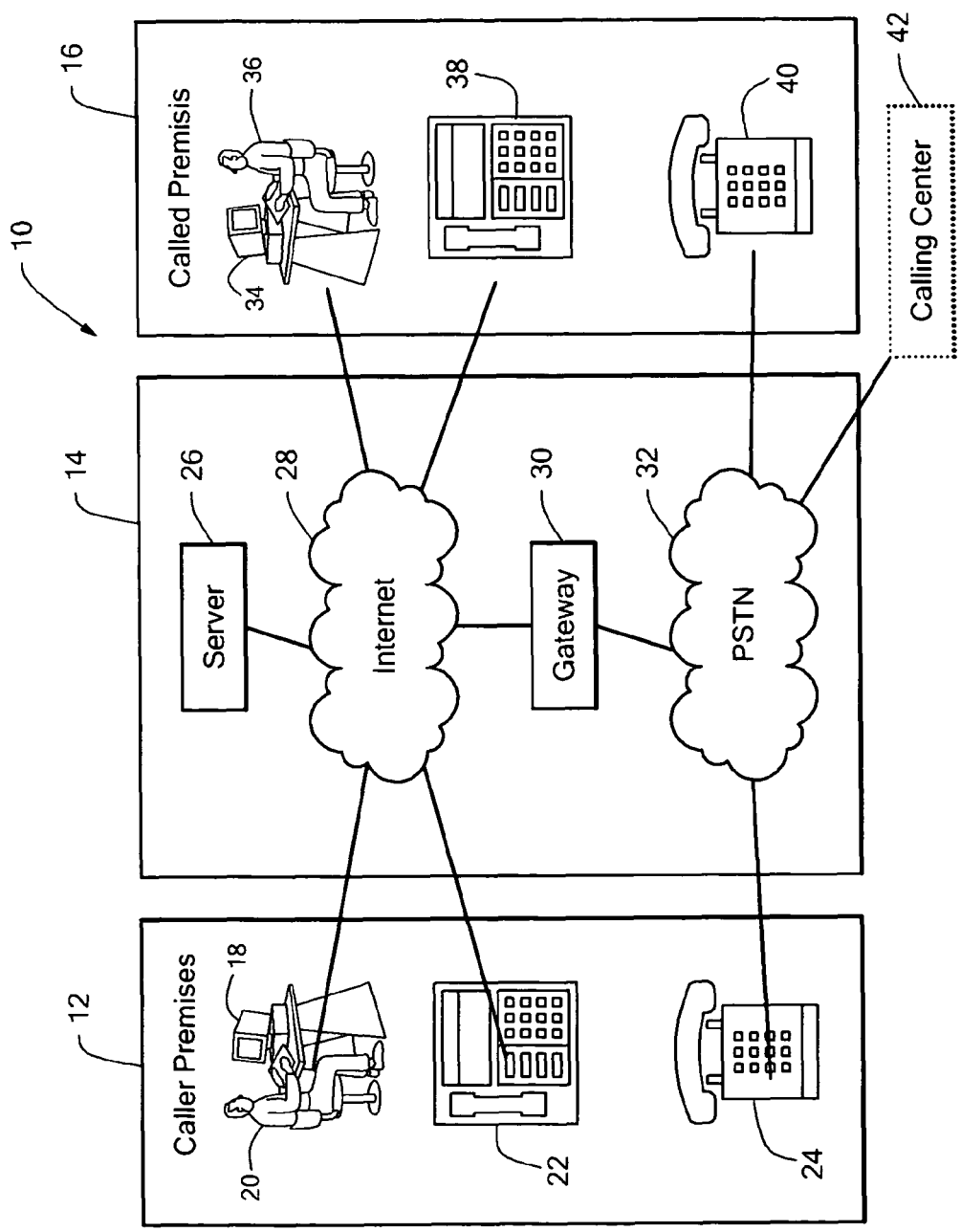
FIG. 1 is a pictorial showing a call arrangement system in accordance with the present invention.

Referring now to FIG. 1, an exemplary call arrangement and connection system 10 includes a telephone call network 14 coupling a caller premises 12 to a called premises 16. The caller premises can include one or more personal computers (PCs), here shown as one PC 18, each used by a respective message sender, here shown as one person 20. The person 20 can be an instant message (IM) user or an E-mail user. The caller premises 12 can also include one or more network or internet telephones, here shown as one network telephone 22, for coupling telephone calls directly to the Internet 28, and one or more conventional telephones, here shown as one conventional telephone 24, for coupling conventional telephone calls to the public switched telephone network (PSTN) 32.

As used herein, a "caller network device" refers to a device used in sending a telephone call, which can be any one of the PC 18, the network telephone 22, and the conventional telephone 24, used by a caller. It should be recognized that the caller network device can be different from or the same as the PC 18 upon which the message sender generates the message. For example, the caller network device can be the conventional telephone 24 (FIG. 1). Also, the message sender 20 can be a different person or the same person as a caller.

The telephone call network 14 can include a server 26 coupled to the Internet 28. As described below, the server 26 has application software, which provides a method that allows the call arrangement system 10 to arrange and place telephone calls. A gateway 30 is coupled between the Internet 28 and the PSTN 32, allowing the server 26 to communicate through the PSTN 32.

The called premises 16 can include one or more personal computers (PCs), here shown as one PC 34, each used by a respective message recipient, here shown as one person 36. The person 36 can also be an instant message (IM) user or an E-mail user. The called premises 16 can also include one or more network or internet telephones, here shown as one network telephone 38, for receiving telephone calls directly from the Internet 28, and one or more conventional telephones, here shown as one conventional telephone 40, for receiving conventional telephone calls from the public switched telephone network (PSTN) 32.

In one particular embodiment, the call arrangement and connection system 10, can include or otherwise be coupled to a calling center 42, here shown to be coupled to the PSTN 32. The calling center is described further below in conjunction with FIG. 3.

As used herein, a "called network device," also a "called endpoint," refers to a device used in receiving a telephone call, which can be any one of the called PC 34, the called network telephone 38, and the called conventional telephone 40. Also, in another embodiment, the "called endpoint" as used herein, can refer to a calling center, for example the calling center 42. It should be recognized that the called network device can be different from or the same as the PC 34 upon which the message recipient receives the message. For example, the called network device can be the conventional telephone 40. Also, the message recipient 36 can be a different person or the same person as a called person.

It should be recognized that the PCs 18, 34 are capable of connecting to the Internet 28 in order to communicate with either data or with voice, for example, to send or receive an Internet telephone call, and also to send or receive an IM or E-mail.

In operation, the present invention allows the caller 20, by way of an IM message presented on the PC 18, to arrange a telephone call by sending the IM to the server 26, i.e., to a network address associated with the server 26. The server can interpret the IM and can arrange the telephone call (also known as third party control). The IM message can be a free-form message or a specific format. The IM can include a variety of information, including, but not limited to, a caller telephone number specifying a telephone number of a caller network device, a caller text description, a caller E-mail address, a caller network address associated, for example, with the PC 18, a called telephone number specifying a telephone number of a called network device, a called endpoint text description, a called endpoint E-mail address, and a called endpoint network address associated, for example, with the PC 34.

The server 26 is adapted to communicate via the gateway 30 with the public switched telephone network (PSTN), and therefore, to connect a telephone call from the caller premises 12 to the called premises 16, e.g., from the caller telephone 24 to any of the called network devices 34, 38, 40 and from the called telephone 40 to any of the caller network devices 18, 22, 24, either through the PSTN 32 alone or through the PSTN 32 and the Internet 28. The server 26 is also adapted to connect, through the Internet 28, a telephone call from either of the PC 18 and the Internet telephone 22 to either of the PC 34 and the Internet telephone 38.

While a particular arrangement is shown in FIG. 1, in which the server 26 is coupled directly to the Internet 28, and the Internet couples to the PSTN 32 through the gateway 30, it should be recognized that in other embodiments, the server 26 can also be coupled directly to the PSTN 32, and can connect telephone calls accordingly. Also, in some embodiments, calls from the called network devices 18, 22 can be connected to the called network devices 34, 38 with the connection passing in part through the PSTN 32, and with a connection to the Internet 28 at either end.

The server 26 can arrange and connect the telephone call at the present time using, for example, the called endpoint telephone number and the caller telephone number contained in the IM as described above. In an alternate embodiment, the message can include date and/or time information and the server 26 can connect the telephone call at a time and date specified in the time information.

The server 26 can provide status information to the caller 20 as to whether the telephone call might be successful, i.e., whether a person is likely to be available to receive the telephone call, or other information about the telephone call. For example, if the called endpoint is a calling center, the calling center can return a reply IM, having an expected telephone wait time or an expected telephone caller queue value. Exemplary processes by which a telephone call can be arranged and placed are described in conjunction with FIGS. 2 and 3 below.

In one particular embodiment, the server 26 is available to communicate only with users who have registered with the server 26, and can require a login/password procedure.

Figure 2:
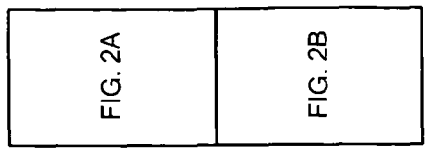
FIG. 2 is a flow chart showing method steps in accordance the call arrangement system of FIG. 1.
Figure 2A:
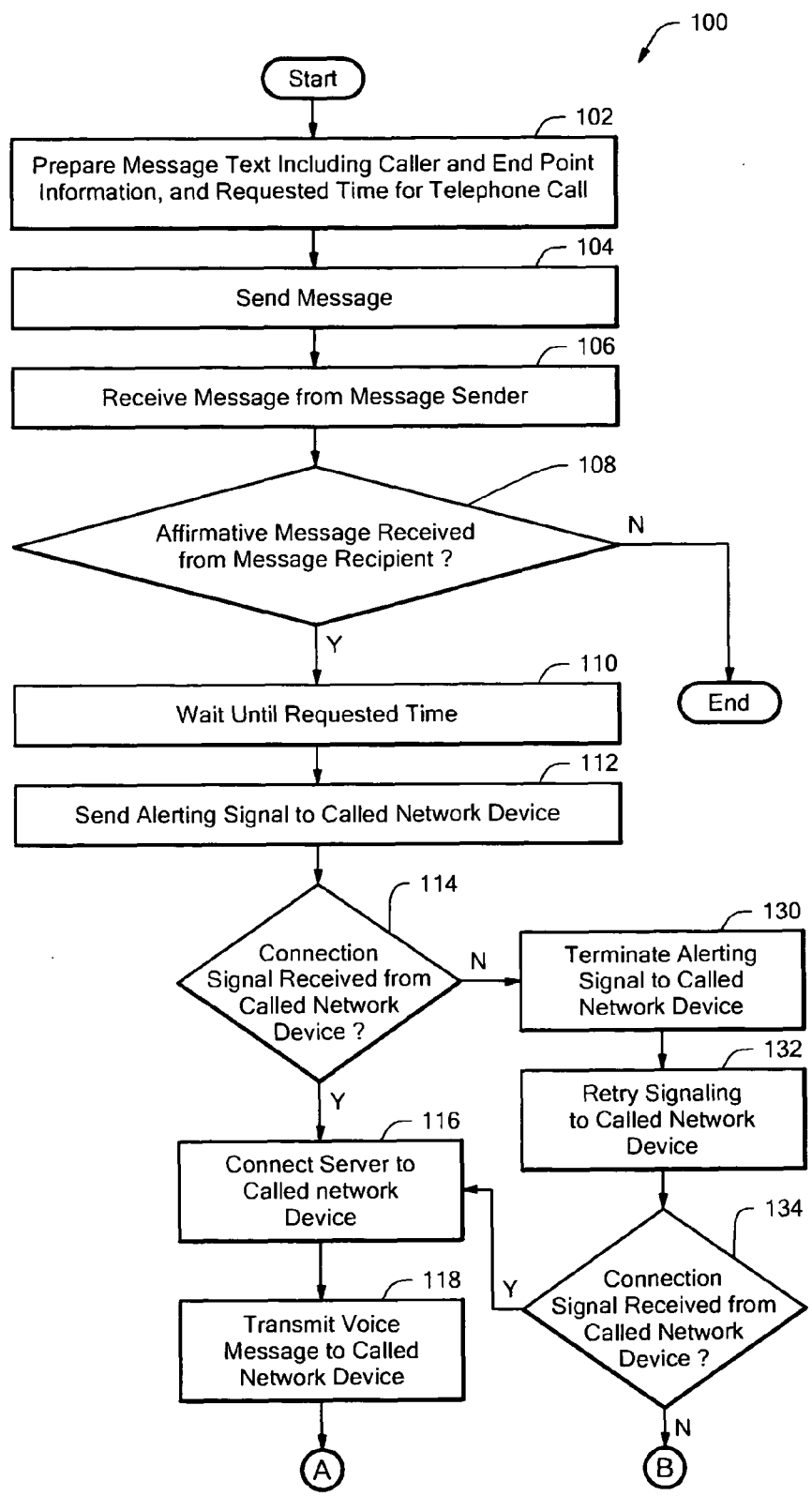
Figure 2B:
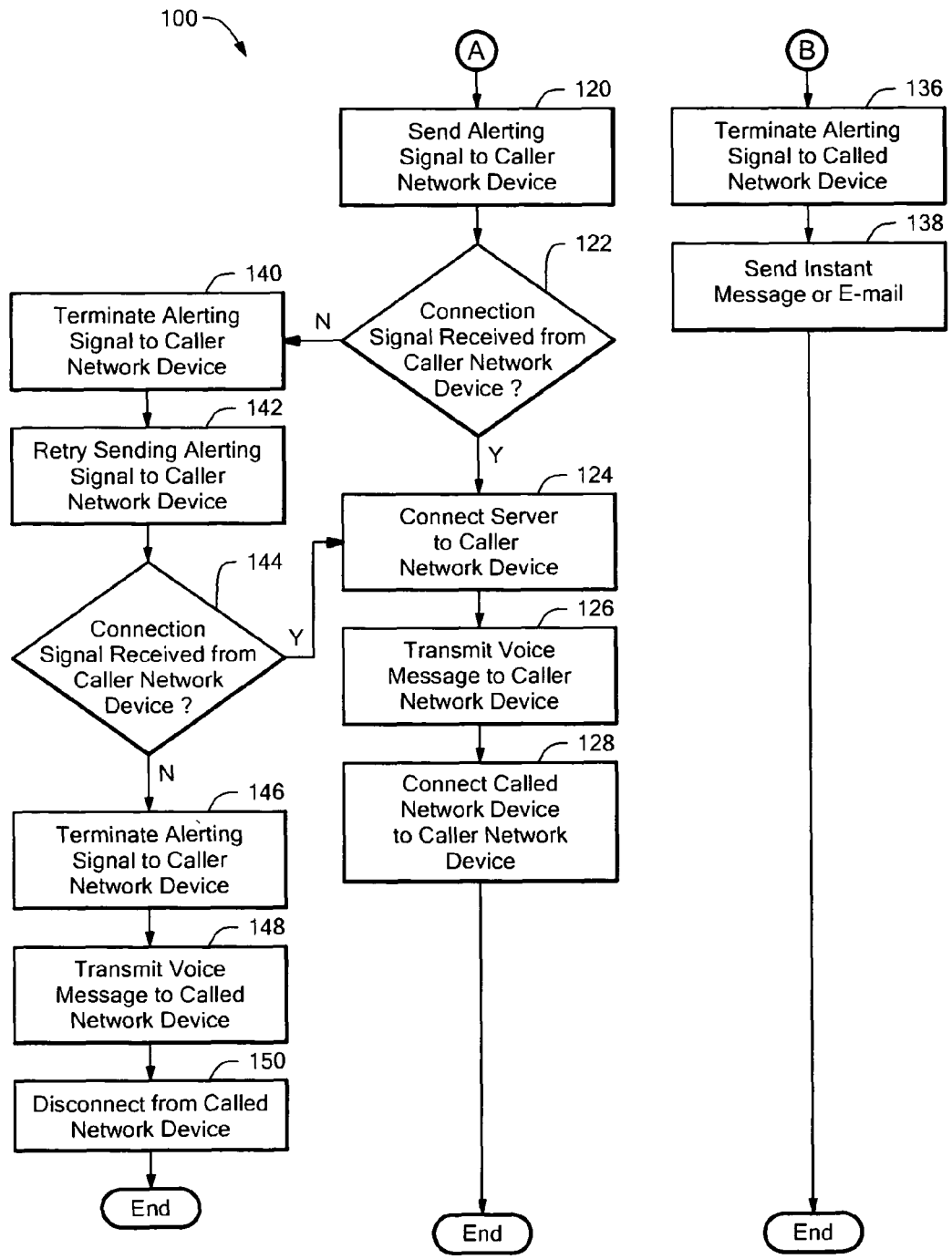

Referring now to FIG. 2, an exemplary call arrangement and connection method 100 associated with the call arrangement and connection system 10 of FIG. 1 begins at step 102, in which a message sender, for example the person 20 (FIG. 1), prepares a message, for example, on the PC 18 (FIG. 1). The message can be an IM or an E-mail, or any form of electronic message. The message can include caller information, including but not limited to, a caller telephone number specifying a telephone number of a caller network device, a caller text description, a caller E-mail address, a caller network address and/or a session identifier (ID) associated, for example, with the PC 18 (FIG. 1), and a caller login name. The message can also include called endpoint information, including but not limited to, a called telephone number specifying a telephone number of a called network device, a called endpoint text description, a called endpoint E-mail address, and a called endpoint network address associated, for example, with the PC 34 (FIG. 1). The message can also include time information corresponding to a future time and date when the caller would like to place a telephone call. In one embodiment, the server 26 (FIG. 1) can already have some of the above caller information as saved caller information that can be automatically recalled by the server 26 upon recognition of the caller login name or other caller information. In one particular embodiment, the user establishes a session with the server 26 prior to or in conjunction with preparing the message at step 102, for example, with the login name.

As described above, it should be recognized that the caller network device can be the same as or different from the PC 18 upon which the message sender generates the message. For example, the caller network device can be the conventional telephone 24 (FIG. 1). Also, the message sender 20 (FIG. 1) can be a different person or the same person as the caller. Also as described above, it should be recognized that the called network device can be the same as or different from the PC 34 upon which the message recipient receives the message. For example, the called network device can be the conventional telephone 40 (FIG. 1). Also, the message recipient 36 can be a different person or the same person as the called person.

At step 104, the message is sent, for example via the Internet 28 (FIG. 1), and, at step 106, the message is received by a server, for example the server 26 (FIG. 1) which provides the message to a message recipient, for example the person 36 (FIG. 1) using the computer 34 (FIG. 1). The server 26 can know if the message recipient is on line, for example, by way of a buddy list. In one particular embodiment, the server 26 can add some or all of the above-described saved caller information to the message upon recognizing the caller information provided in the message before it is sent to the message recipient.

Also, in still another embodiment, as described above, the user establishes a session with the server 26 prior to or in conjunction with preparing the message at step 102, for example, with the login name. In this particular embodiment, some or all of the saved caller information can be automatically recalled by the server 26 and added to the message upon matching the login name with the message, for example by way of an IP address (or the session ID) associated with the message, before the server 26 provides the message to the message recipient. In this particular embodiment, therefore, the user can provide little or no caller information in the message.

An optional decision is made at step 108, determining whether the message recipient has returned a message, for example an instant message or an E-mail message, confirming that they are available to receive a telephone call, either presently, if so requested in the message sent at step 104, or at a future time and date if so requested. If an affirmative response is received, the process continues to step 110, where the system waits until the requested time and date. If, at optional step 108, the message recipient does not return an affirmative message, the process ends and no telephone call is arranged.

At the requested time and date, or immediately if the request was for a telephone call presently, the gateway 30 in combination with the server 26, or the server 26 alone, initiates an alerting signal at step 112 to the called network device (e.g., telephone 40, FIG. 1). The alerting signal can take one of several forms. For example, where the called network device is a conventional telephone, for example the conventional telephone 40 of FIG. 1, the alerting signal can be generated by the gateway 30 in combination with the server 26, or the server 26 alone, resulting in ringing of the conventional telephone 40. For another example, where the called network device is a network telephone, for example, the network telephone 38 of FIG. 1, the server 26 can directly generate a signal to ring the network telephone 38 without the gateway 30. In yet another example, where the called network device is a PC, for example, the PC 34 of FIG. 1, the server 26 can directly generate an alerting signal to the PC 34, for example, as a screen display or as audible tones.

The destination of the alerting signal provided at step 112 can be determined from the called endpoint telephone number within the message received by the server at step 106. However in other embodiments, the destination of the alerting signal can be determined by decoding other portions of the called endpoint information. For example, the called endpoint E-mail address that can be provided within the message at step 102 can be decoded to provide the called endpoint telephone number.

Regardless of the type of called network device, at step 114 the gateway 30 in combination with the server 26, or the server 26 alone, detects if a connection signal is received from the called network device. For example, if the called network device is the conventional telephone 40, a connection signal can correspond to an "off hook" signal generated when a person answers the called telephone 40. It will be recognized, for example, that the PSTN 32 (FIG. 1) can carry an internal message associated with an off-hook event to the server 26 via the gateway 30. Each type of called network device is capable of generating a connection signal to indicate that a connection has been established to a person. If at step 114 a connection signal is detected, the process proceeds to step 116, where the server connects to the called network device (e.g., telephone 40, FIG. 1), either directly via the Internet 28 (FIG. 1) or via the gateway 30 (FIG. 1) and the PSTN 32 (FIG. 1).

At step 118, since a complete telephone call has not yet been connected between two people, a voice massage can be generated by the server 26 and sent to the called network device (e.g., telephone 40, FIG. 1). For example, a voice message can indicate that a telephone connection is in the process of being established.

At step 120, an alerting signal is sent to the caller network device (e.g., telephone 24, FIG. 1) in much the same way that the alerting signal is sent to the called network device at step 112, and the server 26 detects if a connection signal is received from the caller network device in much the same way that the server 26 detects the connection signal from the called network device at step 114. If at step 122 a connection signal is detected, the process proceeds to step 124, where the server 26 connects to the caller network device.

The destination of the alerting signal provided at step 120 can be determined from the caller telephone number within the message received by the server 26 at step 106. However, in other embodiments, the destination of the alerting signal can be determined by decoding other portions of the caller information. For example, the caller E-mail address that can be provided within the message at step 102 can be decoded to provide the caller telephone number.

At step 126, since a complete telephone call has not yet been connected between two people, a voice massage can be generated by the server 26 and sent to the caller network device (e.g., telephone 24, FIG. 1). For example, a voice message can indicate that a telephone connection is in the process of being established.

At step 128, the server 26 causes a connection to be established between the called network device and the caller network device, for example, with a bridging device (not shown) either directly where both devices are network devices, or indirectly via the gateway 30 and the PSTN 32 if either device is a conventional telephone.

If at step 114, no connection signal is received from the called network device (e.g., telephone 40, FIG. 1), the process continues to step 130, where the alerting signal generated at step 112 is terminated, and the alerting signal is re-tried at step 132. It should be recognized that the alerting signal of step 132 can be re-tried any predetermined number of times, including zero times.

A decision is again made at step 134, comparable to the decision made at step 114. If a connection signal is received from the called network device, the process returns to step 116. If the connection signal is not received at step 134, the alerting signal generated at step 132 is terminated at step 136.

At step 138, an instant message or E-mail (or alternatively a telephone call) can be sent back to a person associated with the caller network device (e.g., telephone 24, FIG. 1) by the server 26, indicating that the server 26 was not able to connect the telephone call to the called network device (e.g., telephone 40, FIG. 1) as specified in the message sent at step 104. Also, a called person associated with the called network device can also be notified with an instant message or an E-mail (or alternatively a later telephone call) that they missed a telephone call.

If at step 122, no connection signal is received from the caller network device (e.g., telephone 24, FIG. 1), the process continues to step 140, where the alerting signal generated at step 120 is terminated, and the alerting signal is re-tried at step 142. It should be recognized that the alerting signal of step 142 can be re-tried any predetermined number of times, including zero times.

A decision is again made at step 144 comparable to the decision made at step 122. If a connection signal is received from the caller network device (e.g., telephone 24, FIG. 1), the process returns to step 124. If the connection signal is not received at step 144, the alerting signal generated at step 142 is terminated at step 146.

At step 148, a voice message can be communicated by the server 26 to the called network device previously connected (e.g., telephone 40, FIG. 1), which can indicate that a connection could not be established to the caller network device (e.g., telephone 24, FIG. 1), after which the called network device can be disconnected at step 150.

Figure 3A:
FIG. 3 is a flow chart showing an alternate arrangement of method steps in accordance with the call arrangement system of FIG. 1.
Figure 3A:
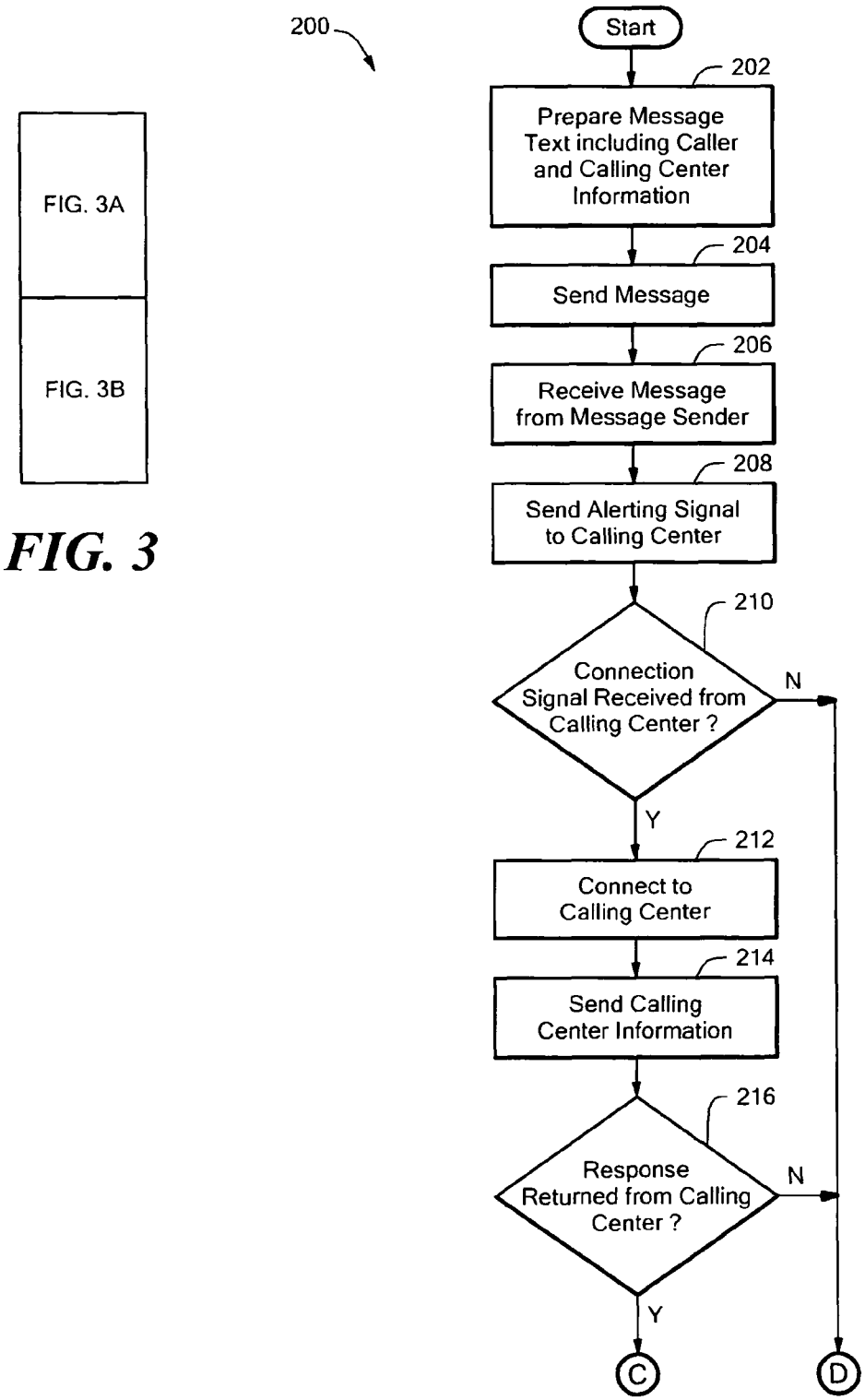
Figure 3B:
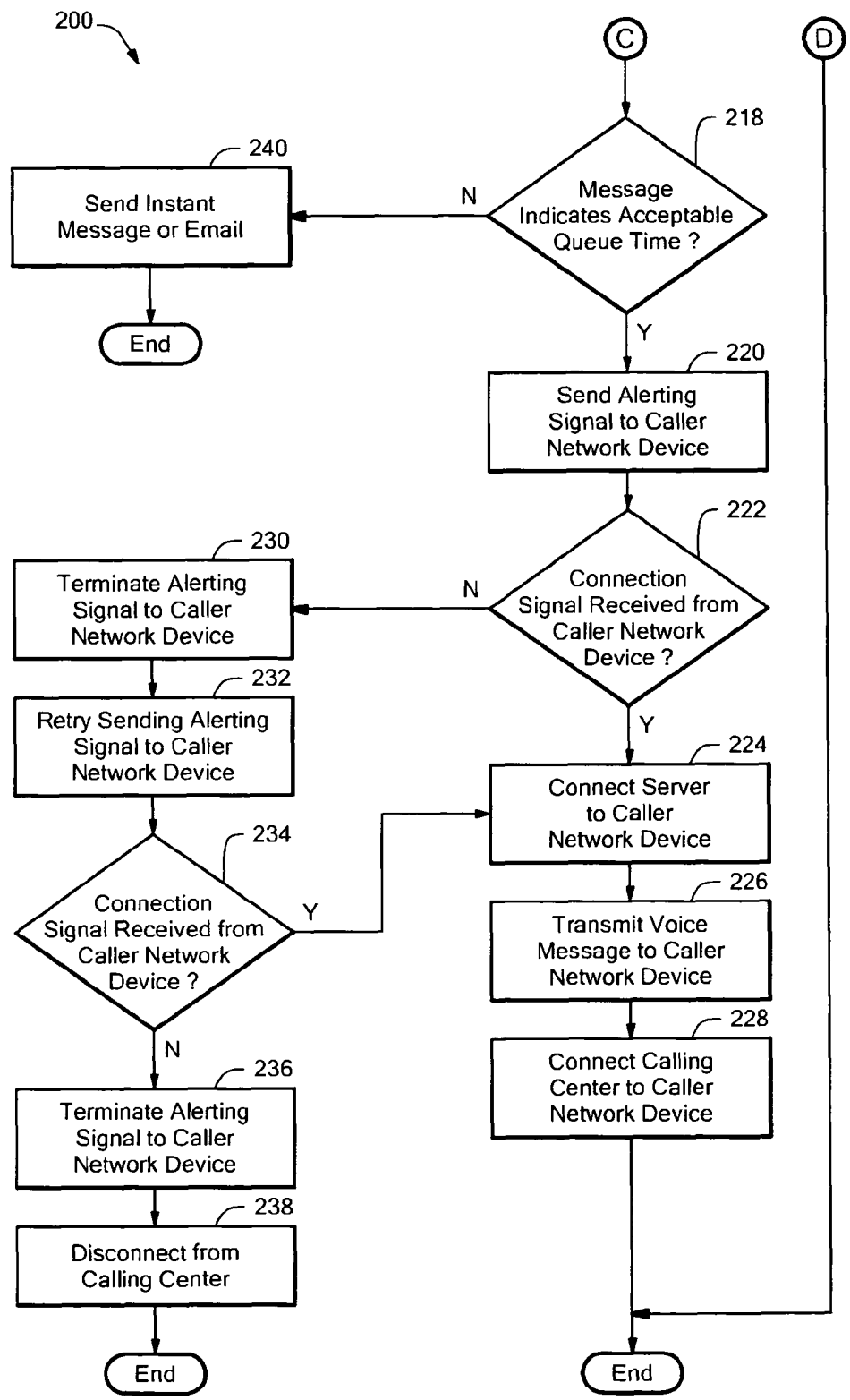

Referring now to FIG. 3, a call arrangement and connection method 200 is used to connect a caller to a calling center, for example the calling center 42 of FIG. 1. As described above, the wait time associated with a calling center can sometimes be very long.

At step 202, a person prepares a message as an IM or an E-mail. The message can include caller information, including but not limited to, a caller telephone number specifying a telephone number of a caller network device, a caller text description, a caller E-mail address, a caller network address and/or a session identifier (ID) associated, for example, with the PC 18 (FIG. 1), and a caller login name. The message can also include calling center information, including but not limited to, a called telephone number specifying a telephone number of the calling center 42, and calling center text description, a calling center E-mail address, a calling center network address, and a calling center acceptable queue time limit. The message can also include other calling center information, for example an IVR sequence associated with an interactive voice response system (IVR), which can automatically generate a progression through an IVR selection tree. In one embodiment, the calling center 42 (FIG. 1), or alternatively, the server 26 (FIG. 1), can already have some of the above caller information as saved caller information that can be automatically recalled by the calling center 42, or alternatively, by the server 26, upon recognition of the caller login name or other caller information. In one particular embodiment, the user establishes a session with the server 26 prior to or in conjunction with preparing the message at step 202, for example, with the login name.

At step 204 the message is sent, for example via the Internet 28 (FIG. 1), and, at step 206, the message is received by a server, for example the server 26 (FIG. 1), which provides the message to the calling center 42. In one particular embodiment, the server 26 can add some or all of the above-described saved caller information to the message upon recognizing the caller information provided in the message before it is provided to the calling center 42. In another embodiment, the calling center 42 can recall some or all of the above-described caller information upon receiving the message.

Also, in still another embodiment, as described above, the user establishes a session with the server 26 prior to or in conjunction with preparing the message at step 202, for example, with the login name. In this particular embodiment, some or all of the saved caller information can be automatically recalled by the by the server 26 and added to the message upon matching the login name with the message, for example by way of an IP address (or the session ID) associated with the message, before the server 26 provides the message to the calling center 42. In this particular embodiment, therefore, the user can provide little or no caller information in the message.

It should be recognized that the caller network device can be different from the PC upon which the message sender generates the message. For example, the caller network device can be the conventional telephone 24 (FIG. 1).

At step 208, the server 26 sends an alerting signal to the calling center 42 in much the same way as described in conjunction with step 112 of FIG. 2. The destination of the alerting signal provided at step 208 can be determined from the calling center telephone number within the message sent at step 204. However, in other embodiments, the destination of the alerting signal can be determined by decoding other portions of the calling center information. For example, the calling center E-mail address, which can be provided within the message at step 202, can be decoded to provide the calling center telephone number.

At step 210, if a connection signal is received from the calling center 42, the process continues to step 212, where a connection is established between the calling center 42 and the server 26. The connection signal can be the same as or similar to the connection signal received at step 114 of FIG. 2. The connection can be established either directly through the Internet or via the gateway (e.g., 30, FIG. 1) and the PSTN.

At step 214 the server 26 sends calling center information to the calling center 42, which can include but is not limited to the IVR sequence prepared as part of the message at step 202. It will be understood that the IVR sequence can correspond to a particular IVR sequence used to establish communication with an agent at the calling center 42. At many calling centers, the IVR sequence corresponds to a simple 0 button push on a telephone keypad, resulting in dual tone frequency modulated (DTFM) tones.

At step 216 a decision is made as to whether a response having calling center "knowledge" is received from the calling center 42. The response from the calling center 42 can be an IM, an E-mail, or a conventional IVR voice response, described above. As used herein, calling center "knowledge" includes data and facts known to the calling center about its own operation. The calling center knowledge can correspond, for example, to one or more of an expected queue time, and a queue value corresponding to a number of calls in line ahead of the present call. At step 218 it is determined from the calling center response if the queue time (or queue value) to connect to an agent is within acceptable limits, for example, two minutes. If the queue time is within acceptable limits, the process proceeds to step 220. Also, if an agent responds, the process proceeds to step 220.

It should be appreciated that steps 214-218 are optional steps. In an alternate embodiment, the calling arrangement and connection method 200 jumps directly from step 212 to step 220, without knowledge of the queue time and queue value.

At step 220, an alerting signal is sent to the caller network device, and the server 26 detects if a connection signal is received from the caller network device at step 222. If at step 222 a connection signal is detected, the process proceeds to step 224, where the server 26 connects to the caller network device.

At step 226, since a complete telephone call has not yet been connected, a voice massage can be presented by the server 26 to the caller. For example, a voice message can indicate that a telephone connection is in the process of being established. At step 228, the server 26 causes a connection to be established between the calling center 42 and the caller network device.

If at step 222, no connection signal is received from the caller network device, the process continues to step 230, where the alerting signal generated at step 220 is terminated, and the alerting signal is re-tried at step 232.

A decision is again made at step 234 comparable to the decision made at step 222. If a connection signal is received from the caller network device, the process returns to step 224. If the connection signal is not received at step 234, the alerting signal generated at step 232 is terminated at step 236. The connection to the calling center 42 is disconnected at step 238.

If at step 210, no connection signal is returned from the calling center 42, indicating no connection to the calling center 42, the process ends. In an alternate arrangement, the server 26 can again try to connect to the calling center 42 beginning again at step 208.

If at step 216, no message is returned from the calling center 42, indicating no connection to the calling center 42 or no message, the process ends. In an alternate arrangement, the server 26 can again try to connect to the calling center 42 beginning again at step 208.

If at step 218, the queue time is unacceptably long, the process continues to step 240, where the server 26 can send an IM or an E-mail back to the message sender indicating that the calling center 42 wait time is unacceptably long. However, in an alternate arrangement, the server 26 can wait and again attempt process steps 208-218 in order to provide a telephone connection to an agent at the calling center 42 at a later time, when the calling center 42 might not be so congested.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims. All references cited herein are hereby incorporated herein by reference in their entirety.

What is claimed is:

1. A method of arranging a telephone call, comprising:
    receiving, from a caller network device, a free form instant text message having caller information associated with the caller network device and called endpoint information associated with a network device to be called, the free form instant text message including a time at which a telephone call is to be initiated;
    initiating an arrangement of the telephone call by a server prior to an attempt to call the network device in response to receiving the free form instant text message, the arrangement being associated with the time to initiate the telephone call;
    sending a first alerting signal to the network device to be called and a second alerting signal to the caller network device automatically by the server at the time included in the free form instant text message, the network device to be called becoming a called network device in response to the first alerting signal being sent, the first and second alerting signals being sent to each of the caller network device and the called device at the time included in the free form instant text message so that the caller network device and the called network device are each called by the server at the time included in the free form instant text message;
    detecting whether a first connection signal is received from the called network device and whether a second connection signal is received from the caller network device;
    attempting to connect the called network device to the caller network device in response to the first connection signal and the second connection signal; and
    sending at least one of an instant message and an e-mail to the caller network device after attempting to connect the called network device to the caller network device fails and in response to the first connection signal not being received from the called network device.

2. The method of claim 1, further comprising:
    establishing a session; and
    recalling saved caller information based upon the session.

3. The method of claim 1, further comprising receiving a confirmation message indicating a successful connection to at least one of the called network device and the caller network device.

4. The method of claim 1, wherein the message further includes time information, and the sending the first alerting signal, the detecting if the first connection signal is received, the connecting to the called network device, the sending the second alerting signal, the detecting if the second connection signal is received, and the connecting the called network device to the caller network device are performed at a time identified in the time information.

5. The method of claim 1, wherein the caller information includes at least one of a caller telephone number, a caller text description, a caller E-mail address, a caller login name, a caller network address, and a session identifier.

6. The method of claim 1, wherein the called endpoint information includes at least one of a called telephone number, a called endpoint text description, a called endpoint E-mail address, a called endpoint network address.

7. The method of claim 1, further comprising decoding the called endpoint information to provide a called telephone number.

8. The method of claim 1, further comprising decoding the caller information to provide a caller telephone number.

9. The method of claim 1, further comprising retrieving a called telephone number associated with the called endpoint information.

10. The method of claim 1, wherein the message includes at least one of an instant message and an E-mail.

11. The method of claim 1, further comprising sending a voice message to the called network device in response to the first connection signal being received from the called network device.

12. The method of claim 1, further including comprising sending a voice message to the caller network device in response to the second connection signal being received from the caller network device.

13. The method of claim 1, further comprising:
    terminating the sending of the first alerting signal to the called network device in response to the first connection signal not being received from the called network device.

14. The method of claim 13, further comprising:
    retrying sending the first alerting signal to the called network device.

15. The method of claim 1, further comprising:
terminating the sending of the second alerting signal to the caller network device in response to the second connection signal not being received from the caller network device.

16. The method of claim 15, further comprising:
retrying sending the second alerting signal to the caller network device.

17. The method of claim 1, further comprising sending a voice message to the called network device in response to the second connection signal not being received from the caller network device and the first connection signal being received from the called network device.

18. The method of claim 1, wherein the caller network device is selected from a telephone and an Internet telephony device and the called network device is selected from a telephone and an Internet telephony device.

19. A method of arranging a telephone call to a calling center, comprising:
receiving, from a caller network device, a free form instant text message having caller information associated with the caller network device and calling center information associated with the calling center, the free form instant text message including a time at which a telephone call is to be initiated;
initiating an arrangement of the telephone call prior to an attempt to call the calling center in response to the free form instant text message, the arrangement being associated with the time to initiate the telephone call;
sending a first alerting signal to the calling center and a second alerting signal to the caller network device automatically by the server at the time included in the free form instant text message, the first and second alerting signals being sent to each of the caller network device and the calling center at the time included in the free form instant text message so that the caller network device and the calling center are each called by the server at the time included in the free form instant text message;
detecting whether a first connection signal is received from the calling center and whether a second connection signal is received from the caller network device;
attempting to connect the caller network device to the calling center in response to the first connection signal and the second connection signal; and
sending at least one of an instant message and an e-mail to the caller network device after attempting to connect the called network device to the caller network device fails and in response to the first connection signal not being received from the called network device.

20. The method of claim 19, further comprising:
establishing a session; and
recalling saved caller information based upon the session.

21. The method of claim 19, wherein the caller information includes at least one of a caller telephone number, a caller text description, a caller E-mail address, a caller login name, a caller network address, and a session identifier.

22. The method of claim 19, wherein the calling center information includes at least one of a called telephone number, a calling center text description, a calling center E-mail address, and a calling center network address.

23. The method of claim 19, further comprising decoding the calling center information to provide a calling center telephone number.

24. The method of claim 19, further comprising decoding the caller information to provide a caller telephone number.

25. The method of claim 19, further comprising retrieving a calling center telephone number associated with the calling center information.

26. The method of claim 19, wherein the message includes at least one of an instant message and an E-mail.

27. The method of claim 19, wherein the caller network device is selected from a telephone and an internet telephony device and the calling center is adapted to couple to at least one of the public switched telephone network and a data network.

28. The method of claim 19, further comprising:
sending at least a portion of the calling center information to the calling center; receiving a calling center response having calling center knowledge in response to the portion of the calling center information; and
connecting the caller network device to the calling center in response to the caller information and to the calling center knowledge.

29. The method of claim 28, wherein the portion of the calling center information includes an interactive voice response system (IVR) sequence associated with an interactive voice response system (IVR).

30. The method of claim 28, wherein the calling center knowledge includes at least one of a calling center expected response time and a calling center queue value.

31. A system for arranging a telephone call, comprising:
a server adapted to receive, from a caller network device, a free form instant text message having caller information associated with the caller network device and called endpoint information associated with a network device to be called, the free form instant text message including a time at which a telephone call is to be initiated, receipt of the free form instant text message initiating an arrangement of the telephone call prior to an attempt to call the network device, the arrangement being associated with the time to initiate the telephone call and the server being adapted to attempt to connect the telephone call in accordance with the arrangement, the caller information, and the called endpoint information; and
a gateway coupled to the server and to a telephony network for providing communications from the server to the telephony network,
wherein at least one of the gateway and the server is adapted to send alerting signals to the network device to be called and to the caller network device in response to the arrangement initiated by the free form instant text message, the network device to be called becoming a called network device in response to one of the alerting signals being sent to the network device to be called and at least one of the gateway, and
wherein the server is further adapted to detect connection signals from the caller network device and from the called network device and send at least one of an instant message and an e-mail to the caller network device after attempting to connect the called network device to the caller network device and in response to the first connection signal not being received from the called network device.

32. The system of claim 31, wherein the gateway is adapted to connect the server to one or more of the called network device and the caller network device, and the gateway is still further adapted to connect the called network device to the caller network device.

33. The system of claim 31, wherein the caller information includes at least one of a caller telephone number, a caller text description, a caller E-mail address, a caller login name, a caller network address, and a session identifier.

34. The system of claim 31, wherein the called endpoint information includes at least one of a called telephone number, a called endpoint text description, a called endpoint network address, a called endpoint E-mail address, and a called endpoint interactive voice response (IVR) sequence.

35. The system of claim 31, further comprising a decoder to decode the called endpoint information to provide a called telephone number.

36. The system of claim 31, further comprising a decoder to decode the caller information to provide a caller telephone number.

37. The system of claim 31, wherein the message includes at least one of an instant message and an E-mail.

38. The system of claim 31, wherein the called network device is associated with a calling center.

39. The system of claim 38, wherein the calling center includes an interactive voice response (IVR) system and the server is further adapted to communicate an IVR sequence to the calling center.

* * * * *